(12) United States Patent  
Ionescu

(10) Patent No.: US 7,952,829 B2  
(45) Date of Patent: May 31, 2011

(54) DETECTING CONTACT BETWEEN A SLIDER AND A DATA STORAGE MEDIUM WITHOUT A SEPARATE CONTACT-DETECTION VOLTAGE SOURCE

(75) Inventor: Stefan Andrei Ionescu, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/236,825

(22) Filed: Sep. 24, 2008

(65) Prior Publication Data

US 2010/0073799 A1    Mar. 25, 2010

(51) Int. Cl.  
 G11B 21/02    (2006.01)  
 G11B 27/36    (2006.01)
(52) U.S. Cl. ............................................ 360/75; 360/31
(58) Field of Classification Search .................... None  
See application file for complete search history.

(56) References Cited

U.S. PATENT DOCUMENTS

| | | | |
|---|---|---|---|
| 4,532,802 A | 8/1985 | Yeack-Scranton et al. ...... 73/432 |
| 4,724,392 A * | 2/1988 | Bandara et al. ................ 324/454 |
| 6,097,559 A | 8/2000 | Ottesen et al. .................. 360/31 |
| 6,181,520 B1 * | 1/2001 | Fukuda ...................... 360/244.1 |
| 6,288,856 B1 | 9/2001 | Ottesen et al. .................. 360/31 |
| 6,700,724 B2 | 3/2004 | Riddering et al. .............. 360/69 |
| 6,775,089 B1 | 8/2004 | Bonin et al. .................... 360/75 |
| 6,876,509 B2 | 4/2005 | Bonin et al. .................... 360/75 |
| 6,967,805 B1 | 11/2005 | Hanchi et al. .................. 360/75 |
| 6,985,326 B2 | 1/2006 | Zhu et al. ........................ 360/75 |
| 7,068,457 B2 | 6/2006 | Riddering et al. .............. 360/75 |
| 7,436,619 B2 * | 10/2008 | Takahashi ...................... 360/75 |
| 2003/0193727 A1 * | 10/2003 | Fioravanti et al. .............. 360/31 |
| 2007/0253090 A1 * | 11/2007 | Hirano et al. ................... 360/75 |
| 2008/0158704 A1 * | 7/2008 | Knigge et al. .................. 360/31 |
| 2008/0204924 A1 * | 8/2008 | Ohno et al. ..................... 360/75 |
| 2009/0135512 A1 * | 5/2009 | Feng et al. ...................... 360/31 |

* cited by examiner

*Primary Examiner* — Andrew L Sniezek  
(74) *Attorney, Agent, or Firm* — Alan G. Rego; Westman, Champlin & Kelly, P.A.

(57) ABSTRACT

A circuit includes a slider, a data storage medium and a contact detection circuit electrically coupled to the slider and to the data storage medium. The contact detection circuit is configured to sense an electrical current indicative of contact between the slider and the data storage medium and responsively provide a contact detection output. The electrical current is produced without the application of a separate voltage between the slider and the data storage medium.

19 Claims, 5 Drawing Sheets

DETECTING CONTACT BETWEEN A SLIDER AND A DATA STORAGE MEDIUM WITHOUT A SEPARATE CONTACT-DETECTION VOLTAGE SOURCE

BACKGROUND

The present embodiments relate to data storage systems, and more particularly to a technique for sensing contact between a slider and a storage medium in a data storage device.

Mass storage devices are one of many components of modern computers. One type of mass storage device is a disc drive. A typical disc drive includes a head stack assembly (HSA) that has one or more magnetic discs which are rotated by a spindle motor at a substantially constant high speed and accessed by an array of read/write heads which store data on tracks defined on the disc surfaces. Each head is carried by a slider which is designed to "fly" just over the surface of the rotating disc. Each slider is a part of a head-gimbal assembly (HGA), which also includes a suspension (beam and gimbal strut) for positioning the slider and an interconnect (for example, a flexible circuit) that carries electrical signals between the head and drive electronics. A printed circuit board assembly (PCBA), which includes electronics used to control the operation of the HSA, is typically mounted to the underside of the HSA to complete the disc drive.

As the density of data recorded on magnetic discs continues to increase, it is becoming necessary for the spacing between the head carried by the slider and the disc to decrease to very small distances. Spacings of well below 10 nanometers (nm) are required in some applications. In disc drive systems having such small slider-disc spacing, the possibility of contact between the slider and the disc is relatively high, due to factors such as slider manufacturing process limitations and limited air-bearing modeling capabilities. A system for detecting such contacts is useful for a number of diagnostic tests, enabling assessments such as component-level fly-ability and durability, drive-level reliability, and production-level screening to be made, as well as providing input to fly-height calibration and adaptive-fly-control systems that enable dynamic adjustment of flying height in certain disc drive systems.

Existing methods of detecting contact between a slider and a disc typically involve acoustic emission (AE) monitoring by an external AE sensor such as a piezoelectric element having suitable frequency response and sensitivity. While AE sensors are generally effective to detect high intensity and catastrophic slider-disc contact events, their detection abilities are somewhat limited. The use of an external sensor limits the AE sensor's sensitivity to remotely occurring slider-disc contact events. The physical dimensions of the AE sensor also preclude optimum placement of the sensor in many component-level testing arrangements. Furthermore, the effectiveness of conventional AE sensors may be severely limited by the introduction of polymer-based ("flex") gimbals, due to the heavy AE attenuation of such gimbals, which act as a high acoustic impedance component between the slider-disc interface and the suspension.

The present embodiments address these problems and offer other advantages over the prior art.

SUMMARY

An aspect of the disclosure relates to detecting contact between a slider and a data storage medium without the application of a separate voltage between the slider and the data storage medium for slider-medium contact detection.

In one apparatus embodiment, a circuit includes a contact detection circuit that is configured to electrically couple to a slider and to a data storage medium. The contact detection circuit is configured to sense an electrical current indicative of contact between the slider and the data storage medium and responsively provide a contact detection output. The electrical current is produced without the application of a separate voltage between the slider and the data storage medium.

In another apparatus embodiment, a circuit includes a slider, a data storage medium and a contact detection circuit electrically coupled to the slider and to the data storage medium. The contact detection circuit is configured to sense an electrical current indicative of contact between the slider and the data storage medium and responsively provide a contact detection output. The electrical current is produced without the application of a separate voltage between the slider and the data storage medium.

In still another apparatus embodiment, a circuit includes a slider having a contact feature, and a contact detection circuit. An interconnect electrically couples the contact feature of the slider to the contact detection circuit without a trace for direct electrical connection between a substrate of the slider and a ground of the contact detection circuit.

These and various other features and advantages will become apparent upon reading the following detailed description and upon reviewing the associated drawings.

DETAILED DESCRIPTION

Figure 1:
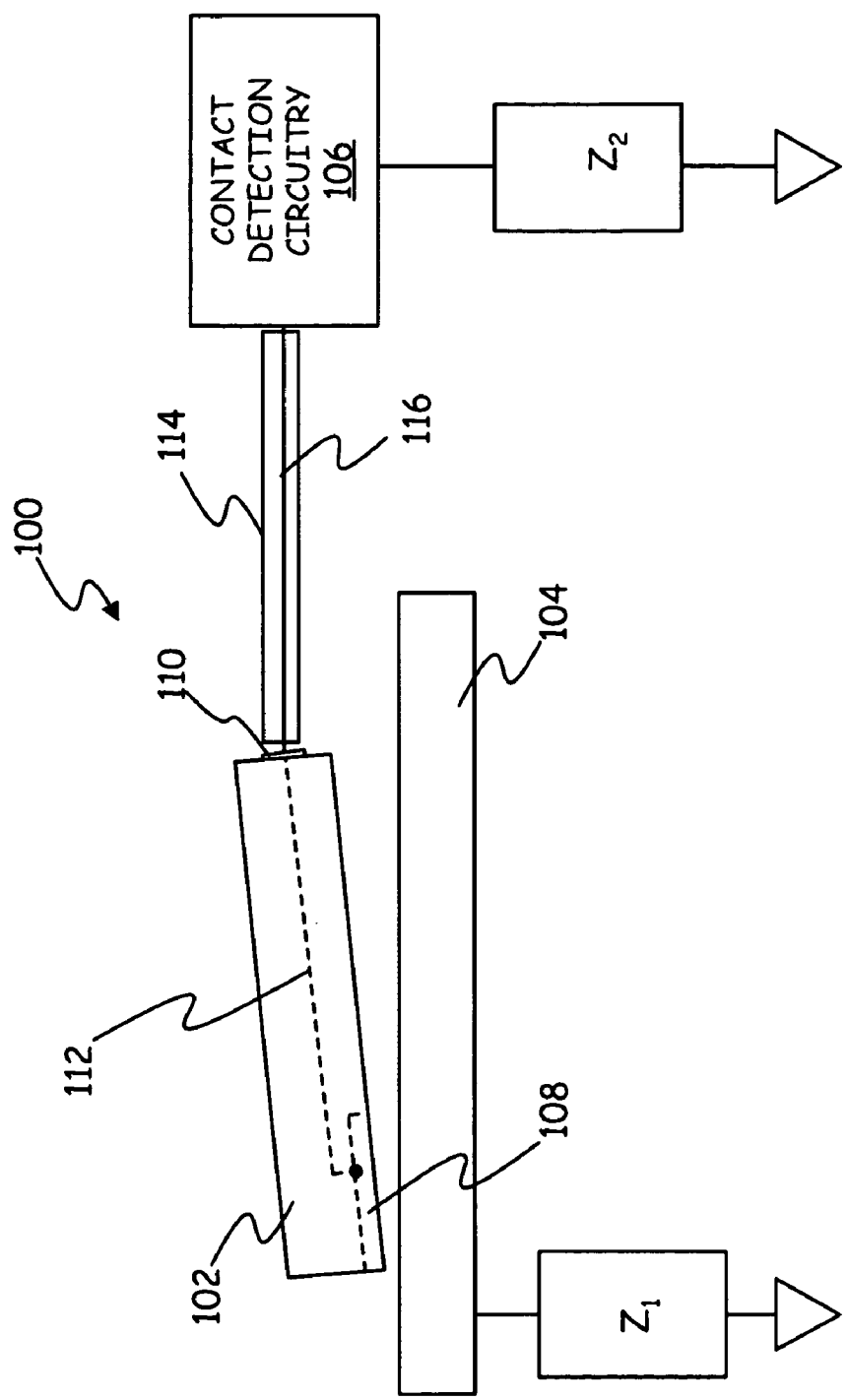
FIG. 1 is a simplified diagrammatic illustration of a circuit that includes elements for detecting contact between a slider and a data storage medium in accordance with the present embodiments.

FIG. 1 is a simplified diagrammatic illustration of a circuit 100 that includes elements for detecting contact between a slider 102 and a data storage medium 104 in accordance with the present embodiments. For example, and not by limitation, the contact can include direct contact of slider 102 with the medium 104. In another example, the contact can include occasional contact of slider 102 with the surface roughness of the medium 104, often referred to as "pseudo-contact." Thus, in general, different embodiments described below are capable of detecting "ultra-light" intermittent slider-medium contact events and even "near-contact" events prior to the onset of continuous slider-medium contact, for example. Therefore, as used herein, the term contact means any sufficient proximity to allow electrical coupling between a slider and a data storage medium. The same reference numerals are used in the various figures to represent the same or similar elements. As will be apparent from the description further below, the present embodiments are useful in a number of disc drive-related applications, for example. In disc drive-related applications, data storage medium 104 is a disc and circuit 100 is a part of a head stack assembly (not shown). As indicated earlier, in a disc drive, when disc 104 rotates, slider 102 flies just over disc 104. In accordance with the present embodiments, contact detection circuit 106, which is electrically coupled to slider 102 and to data storage medium 104, detects contact between slider 102 and data storage medium 104 by sensing an electrical current that flows in circuit 100 when contact occurs between slider 102 and data storage medium 104. To facilitate contact detection in accordance with one exemplary aspect of the disclosure, slider 102 includes an electrically conductive region 108 that faces data storage medium 104 and one or more head connection pads 110 that are used to electrically couple slider 102 to external circuitry. Electrically conductive region 108 is electrically coupled to head connection pad 110 by electrical connection 112. Contact detection circuit 106 is connected to head connection pad 110 via an electrically conductive trace 116 on an interconnect 114. It should be noted that no separate control voltage source across the interface between slider 102 and data storage medium 104 is needed to produce a current when contact occurs between slider 102 and data storage medium 104. This embodiment makes use of an inherent potential difference that exists between slider 102 and data storage medium 104 when slider 102 is connected to circuitry that enables it to carry out read/write operations on data storage medium 104. Specifically, a difference between impedance $Z_1$ and impedance $Z_2$ accounts for the potential difference between slider 102 and data storage medium 104. In general, the sensing system is simpler than prior AE sensors, and does not suffer from many of the earlier-noted limitations of such sensors.

The sensing system of one or more of the present embodiments may be used in a number of disc drive-related applications. It may be employed in a spinstand tester for assessing component-level flyability and durability. It might also be used for drive-level reliability assessment of disc drives, both in their early mechanical phases and in fully functional drives. Screening of head gimbal assemblies (HGAs) in pre-production phases as well as production phases is possible with the present embodiments, whether the HGA employs a conventional metal gimbal or a "flex" (polymer-based) gimbal. Although the contact sensing system may be implemented independently of systems that control the flying height of the slider, the output of contact detection circuit 106 may be useful as an input to fly-height calibration and adaptive-fly-control systems that enable dynamic adjustment of flying height in certain disc drive systems. Those skilled in the art will recognize that still further applications may exist for the system of the present embodiments due to its versatility and broad level of efficacy.

Figure 2:
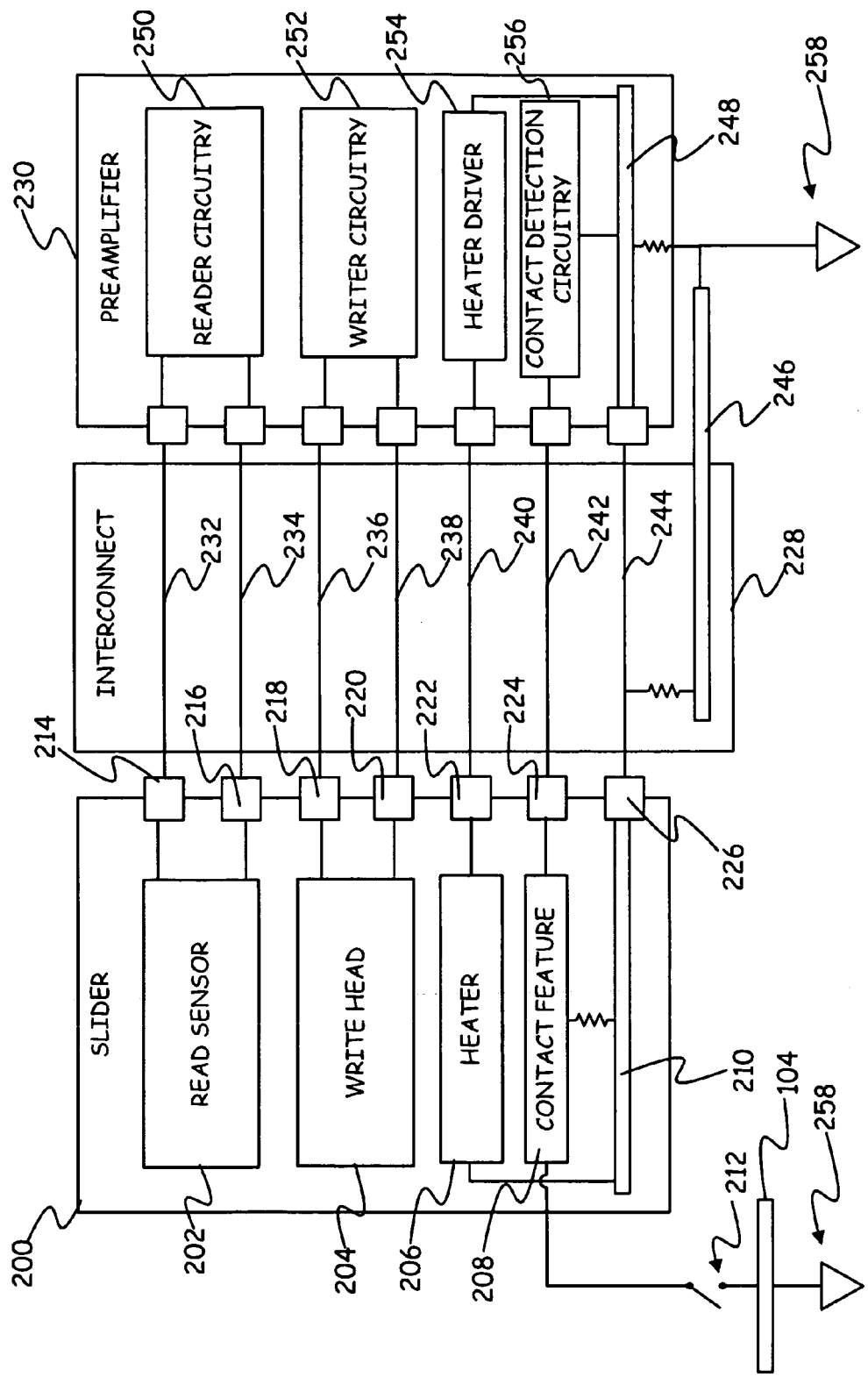
FIGS. 2, 3 and 4 are diagrammatic illustrations showing components of sliders and electrical connections to the components of the sliders in accordance with the present embodiments.

FIG. 2 is a diagrammatic illustration showing components of an exemplary slider and electrical connections to the slider components in accordance with one embodiment. As can be seen in FIG. 2, slider 200 includes a read sensor 202, a write head 204 a heater 206 and a contact feature 208, which is a specific example of an electrically conductive region (such as 108 of FIG. 1) that faces a data storage medium (such as 104 of FIG. 1). In the interest of simplification, only heater 206 and contact feature 208 are shown connected to slider substrate 210 since other electrical connections, within slider 200, to substrate 210 are not relevant to the present embodiments. Also, a switch 212 has been illustrated to indicate a contact status (open position of switch 212 is indicative of no contact and a closed position represents contact) between contact feature 208 and data storage medium 104. For other types of applications where the contact feature is used for "near-contact" or "proximity detection," the closed position of switch 212 should be interpreted not as physical contact but as a sufficiently small separation between the contact feature 208 and the storage medium 104.

In the embodiment shown in FIG. 2, slider 200 includes seven head connection pads, which are numbered 214 through 226. As can be seen in FIG. 2, the different components within slider 200 are connected to circuitry within a preamplifier 230 via an interconnect 228, which includes multiple head connection traces 232 through 246, each of which connect to a different one of head connection pads 214 through 226. Specifically, read sensor 202 is connected to read circuitry 250 within preamplifier 230 with the help of head connection pads 214 and 216 and traces 232 and 234. Similarly, write head 204 is connected to writer circuitry 252 via head connection pads 218 and 220 and traces 236 and 238. Heater 206 is coupled to heater driver 254 via head connection pad 222 and trace 240 and also coupled to slider substrate 210. Contact feature 208 is coupled to contact detection circuit 256 via head connection pad 224 and head connection trace 242 and also coupled to slider substrate 210. Slider substrate 210 is coupled to preamplifier ground 248 via head connection pad 226 and head connection trace 244. A suspension that supports slider 200 and interconnect 228 is denoted by reference numeral 246. Suspension 246 is electrically connected to head connection pad 226 and to circuit ground 258. It should be noted that, in the embodiment of FIG. 2, head connection pad 224 and head connection trace 242 have been included specifically for connecting contact feature 208 to contact detection circuit 256. Thus, pad 224 and trace 242 are referred to herein as a slider-medium contact detection pad and a slider-medium contact detection trace, respectively.

In operation, if switch 212 goes to a closed position (i.e., when contact occurs between slider 200 and the data storage medium 104) a resulting current is detected by contact detection circuit 256. The resulting current is due to a potential difference between data storage medium 104 and preamplifier ground 248, charge swiping and/or field emission, for example. Upon detection of the current, contact detection circuit 256 provides an output indicative of the contact event to a fault handling circuit (not shown) or any other suitable circuit. The embodiments described below in connection with FIGS. 3 and 4 are capable of providing slider-medium contact detection in a manner similar to the embodiment of FIG. 2, but without the inclusion of one or both of an additional slider pad (such as slider-medium contact detection pad 224) and an additional interconnect trace (such as slider-medium contact detection trace 242).

Figure 3:
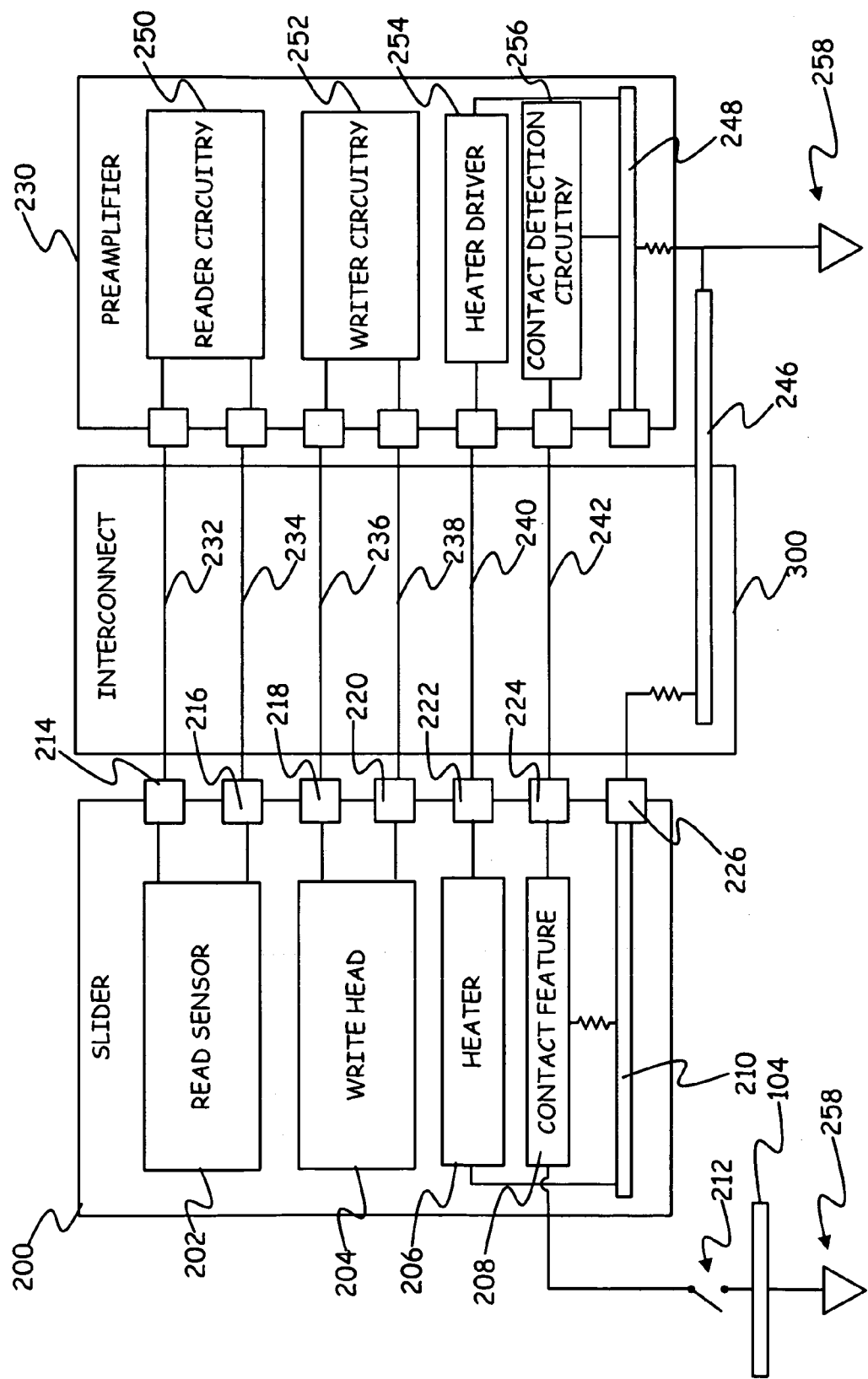

FIG. 3 is a diagrammatic illustration showing components of an exemplary slider and electrical connections to the slider components in accordance with another embodiment. As indicated above, the circuit of FIG. 3 operates in a manner similar to the circuit of FIG. 2. However, unlike interconnect 228 (of FIG. 2) which includes seven traces, interconnect 300 of FIG. 3 includes only six traces. Here, pad 226 is connected, without the use of a trace, only to suspension 228 and is not connected to preamplifier ground 248 via any trace. Connection of slider substrate 210 to system circuit ground 258 occurs only via suspension 246. In the embodiment of FIG. 3, there is no need for the inclusion of an addition trace for connecting slider-medium contact detection pad 224 to contact detection circuit 256 and, in general, any suitable interconnect with six traces can be utilized to provide the necessary electrical connections in the embodiment of FIG. 3. As in the case of the embodiment shown in FIG. 2, in the embodiment of FIG. 3, if switch 212 goes to a closed position (i.e., when contact occurs between slider 200 and the data storage medium 104) a resulting current is detected by contact detection circuit 256. Again, the resulting current is due to a potential difference between data storage medium 104 and preamplifier ground 248, charge swiping and/or field emission, for example.

Figure 4:
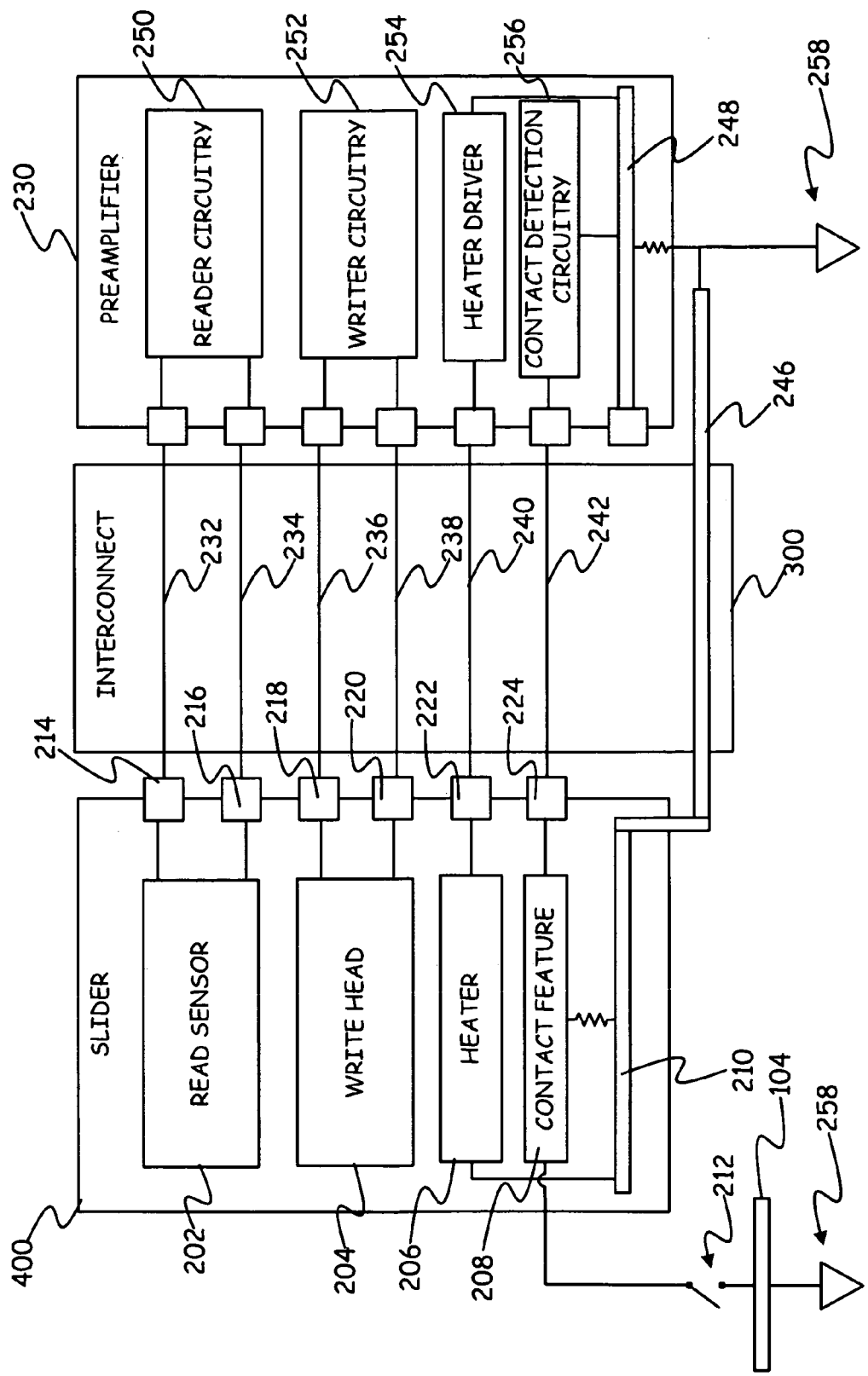

FIG. 4 is a diagrammatic illustration showing components of an exemplary slider and electrical connections to the slider components in accordance with still another embodiment. As indicated above, the circuit of FIG. 4 operates in a manner similar to the circuits of FIGS. 2 and 3. However, in addition to using an interconnect 300 with only six traces, slider 400 of FIG. 4 utilizes only six head connection pads. Here, suspension 246 is configured such that, when slider 400 is attached to suspension 246, slider substrate 210 directly electrically connects to suspension 246 without the use of a trailing edge pad (such as pad 226 shown in FIG. 3). Thus, connection of slider substrate 210 to system circuit ground 258 occurs only via suspension 246.

Figure 5:
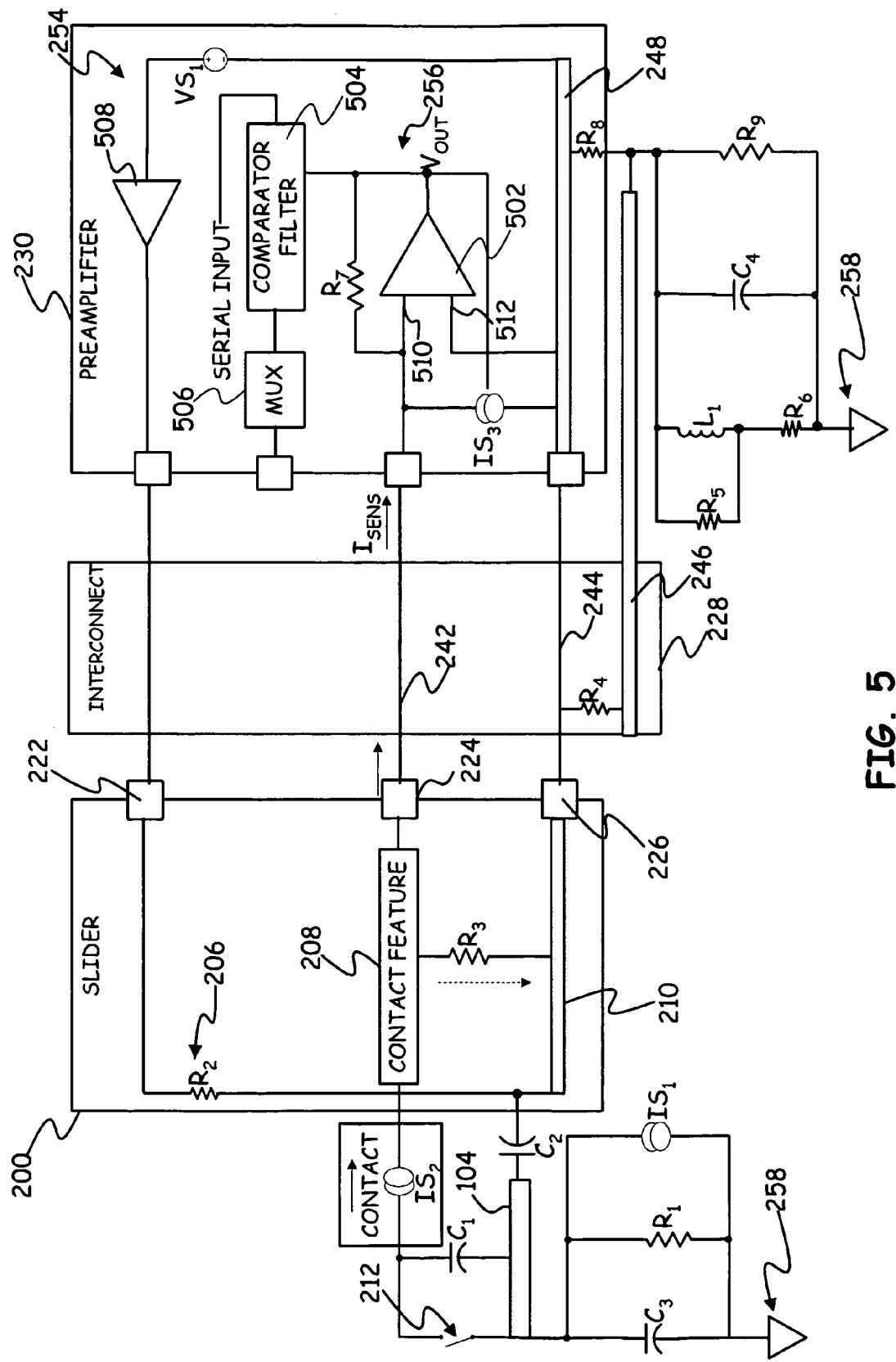
FIG. 5 is a diagrammatic illustration of an exemplary detailed implementation of the circuit of FIG. 2.

FIG. 5 is an exemplary detailed implementation of the circuit of FIG. 2. For simplification, read sensor 202, write head 204, read circuitry 250, write circuitry 252 and the pads and traces that connect read sensor 202 to read circuitry 250, and write head 204 to write circuitry 252, are not shown in FIG. 5. Thus, in FIG. 5, slider 200 is shown with only contact feature 208 and with a resistor $R_2$, which serves as heater 206 for slider 200. Within preamplifier 230, contact detection circuitry 256 includes an operational amplifier 502, an operational amplifier feedback resistor $R_7$, a comparator and filter 504 and a multiplexer (MUX) 506. Operational amplifier output $V_{OUT}$ is provided to comparator and filter and also to transimpedance $IS_3$. A serial input delivers data to comparator and filter 504 to set its comparison threshold and filter properties. Heater driver 240 comprises a source $VS_1$ whose output is amplified by a power amplifier 508 that outputs a power signal that delivers the necessary energy to produce heat. In the circuit of FIG. 5, resistor $R_1$ represents a resistance between storage medium 104 and circuit ground 258, capacitor $C_3$ represents a capacitance between storage medium 104 and ground 258. Current source $IS_1$ simulates a charging mechanism between storage medium 104 and ground 258. Resistors $R_5$, $R_6$ and $R_9$, and capacitor $C_4$ and inductor L1, in the configuration shown in FIG. 5, together represent an impedance between suspension 246 and circuit ground 258. Resistor $R_3$ is an eventual bleeder resistor between contact feature 208 and slider ground 210. It should be noted that resistor R3 is optional and therefore not necessary for proper functioning of the charge-sensing scheme. Resistor $R_4$ represents a resistance of a plated via to connected slider substrate 210 to suspension 246. Resistor $R_8$ represents a resistance of a soldering pin used to connect preamplifier ground to suspension 246. $IS_2$ is a current source to represent a current produced between slider 200 and storage medium 104, and capacitors $C_1$ and $C_2$ represent different capacitances between slider 200 and disc 104.

In operation, when there is no contact between slider 200 and storage medium 104, contact feature 208 is kept by circuit 256 at the same potential as the amplifier input 512 (therefore at the preamplifier ground potential 248). When contact occurs between slider 200 and storage medium 104, a pulse of current $IS_2$ is produced. This current has to find a way to ground and therefore it flows into the node 510 and produces a voltage pulse at the amplifier output Vout. Some of the contact current could be diverted through the resistor R3 if its value is too small when compared to the input impedance into node 510. This would reduce the sensitivity of the scheme. Comparator and filter 504 responsively provides a logic pulse to MUX 506, which provides an output indicative of contact between slider 200 and storage medium 104 to fault handling circuitry, for example. It should be noted that MUX 506 is part of conventional preamplifier fault detection logic. It should also be noted that any bias voltages provided within the preamplifier circuit do not result in the contact detection circuit 256 providing any separate voltage between slider 200 and data storage medium 104. It should be noted that circuitry similar to that shown in FIG. 5 can also be used for specific implementations of the embodiments shown in FIGS. 3 and 4.

It is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular type of system (disc drive, spinstand tester, etc.) in which the slider-medium contact detection technique is used without departing from the spirit and scope of the present disclosure.

What is claimed is:

1. A circuit comprising:
   a slider that is electrically coupled to a suspension, the slider having a contact feature that is connected to a ground of the slider via a bleeder resistor; and
   a contact detection circuit configured to electrically couple to the contact feature of the slider and to a data storage medium, the contact detection circuit is configured to detect an electrical current, through a path that includes the data storage medium and the contact feature of the slider, indicative of contact between the slider and the data storage medium and responsively provide a contact detection output,
   wherein the contact detection circuit has a contact detection sensitivity that is based on a value of the bleeder resistor compared to an input impedance value of the contact detection circuit, which limits a quantity of the electrical current diverted to the bleeder resistor and away from the contact detection circuit.

2. The circuit of claim 1 wherein the contact detection circuit is a part of a preamplifier circuit.

3. The circuit of claim 2 wherein a ground of the preamplifier circuit is directly electrically connected, via a trace, to the ground of the slider when the contact detection circuit is electrically coupled to the contact feature of the slider and to the data storage medium.

4. The circuit of claim 2 wherein the contact detection circuit is electrically coupled to the contact feature of the slider and to the data storage medium without a direct electrical connection between the ground of the slider and a ground of the preamplifier.

5. The circuit of claim 2 wherein any bias voltages provided within the preamplifier circuit do not result in the contact detection circuit providing a separate voltage between the slider and the data storage medium.

6. A circuit comprising:
   a slider that is electrically coupled to a suspension, the slider having a contact feature that is connected to a ground of the slider via a bleeder resistor;
   a data storage medium; and
   a contact detection circuit electrically coupled to the contact feature of the slider and to the data storage medium, the contact detection circuit is configured to detect an electrical current, through a path that includes the data storage medium and the contact feature of the slider, indicative of contact between the slider and the data storage medium and responsively provide a contact detection output, wherein the electrical current is produced without the application of a separate voltage between the slider and the data storage medium, and wherein the contact detection circuit has a contact detection sensitivity that is based on a value of the bleeder resistor compared to an input impedance value of the contact detection circuit, which limits a quantity of the electrical current diverted to the bleeder resistor and away from the contact detection circuit.

7. The circuit of claim 6 wherein the contact detection circuit is electrically coupled to the contact feature of the slider via a head connection pad which is a head-medium contact detection pad added for connection to the contact detection circuit.

8. The circuit of claim 7 and further comprising an interconnect having a head connection trace, which electrically couples the head-medium contact detection pad to the contact detection circuit.

9. The circuit of claim 6 wherein the contact detection circuit is a part of a preamplifier circuit.

10. The circuit of claim 9 and further comprising an interconnect having a head connection trace, which directly electrically couples a head connection pad, connected to the ground of the slider, to a ground of the preamplifier circuit.

11. The circuit of claim 10 wherein the interconnect comprises seven head connection traces that electrically couple to the slider and to the preamplifier circuit and wherein the head connection trace, which directly electrically couples the head connection pad connected to the ground of the slider to the ground of the preamplifier circuit, is one of the seven head connection traces.

12. The circuit of claim 11 wherein the slider comprises seven head connection pads and wherein the head connection pad connected to the ground of the slider is one of the seven head connection pads.

13. The circuit of claim 9 and further comprising an interconnect having a head connection trace, which electrically couples a head-medium contact detection pad to the contact detection circuit.

14. The circuit of claim 13 wherein the contact detection circuit is electrically coupled to the contact feature of the slider and to the data storage medium without a direct electrical connection between the ground of the slider and a ground of the preamplifier.

15. The circuit of claim 14 wherein the interconnect comprises only six traces and wherein the head connection trace, which electrically couples a head-medium contact detection pad to the contact detection circuit, is one of the six traces.

16. The circuit of claim 15 wherein the slider comprises seven head connection pads and wherein the head-medium contact detection pad is one of the seven head connection pads.

17. The circuit of claim 15 wherein the slider comprises only six head connection pads and wherein the head-medium contact detection pad is one of the six head connection pads.

18. A circuit comprising:
 a slider having a contact feature, which is an electrically conductive region of the slider that faces a data storage medium and is separate from at least one other portion of the slider, the contact feature is connected to a ground of the slider via a bleeder resistor;
 a contact detection circuit; and
 an interconnect that electrically couples the contact feature of the slider to the contact detection circuit without a trace for direct electrical connection between the ground of the slider and a ground of the contact detection circuit,
 wherein the contact detection circuit is configured to sense an electrical current indicative of contact between the contact feature of the slider and the data storage medium, and
 wherein the contact detection circuit has a contact detection sensitivity that is based on a value of the bleeder resistor compared to an input impedance value of the contact detection circuit, which limits a quantity of the electrical current diverted to the bleeder resistor and away from the contact detection circuit.

19. The circuit of claim 18 wherein the slider comprises only six head connection pads and wherein the interconnect comprises only six head connection traces.

* * * * *